United States Patent [19]

Schaffner et al.

[11] Patent Number: 5,465,269
[45] Date of Patent: Nov. 7, 1995

[54] METHOD AND APPARATUS FOR ENCODING AND DECODING A SUPPLEMENTARY SIGNAL

[75] Inventors: T. Michael Schaffner; William R. Bayer, both of Palatine; Michael J. Bach, Niles, all of Ill.

[73] Assignee: Motorola, Inc., Schaumburg, Ill.

[21] Appl. No.: 190,433

[22] Filed: Feb. 2, 1994

[51] Int. Cl.⁶ .................... H04B 1/69; H04B 1/707; H04J 13/02; H04J 13/04
[52] U.S. Cl. .................. 375/200; 375/205; 375/206; 380/34; 370/18; 370/21; 370/22; 370/110.1
[58] Field of Search ................... 375/1; 380/34; 370/18, 110.1, 110.4, 111, 11, 21, 22; 455/33.1, 53.1, 54.1, 67.1, 67.3, 33.3; 329/304, 306, 310

[56] References Cited

U.S. PATENT DOCUMENTS

| | | | |
|---|---|---|---|
| 3,747,003 | 7/1973 | Siglow | 329/310 |
| 3,798,561 | 3/1974 | Bocker | 329/306 |
| 3,860,870 | 1/1975 | Furuya | 370/11 |
| 4,189,677 | 2/1980 | Cooper et al. | 375/1 |
| 4,222,115 | 9/1980 | Cooper et al. | 375/1 |
| 4,675,863 | 6/1987 | Paneth et al. | 455/33.3 X |
| 4,876,740 | 10/1989 | Levine et al. | 455/33.2 |

OTHER PUBLICATIONS

TIA/EIA Interim Standard, Mobile Station–Base Station Compatibility Standard for Dual–Mode Wideband Spread Spectrum Cellular System, TIA/EIA/IS–95, Tables of Contents, §6–§6.3.1.8 & §7–§7.1.3.1.8, pp. i–xl, 6–1 to 6–25, & 7–1 to 7–17.

*Primary Examiner*—Bernarr E. Gregory
*Attorney, Agent, or Firm*—Daniel W. Juffernbruch

[57] ABSTRACT

A differential coherent modulation and demodulation method and apparatus non-coherently modulates (201) a data stream to generate non-coherently modulated data. The non-coherently modulated data is phase modulated (215) with a supplementary signal (211) to generate coded data. The coded data is then transmitted. A receiver (301) then receives the coded data. A non-coherent demodulator accepts the received coded data as input and demodulates the coded data to provide the original data and the supplementary signal (327).

11 Claims, 3 Drawing Sheets

1

METHOD AND APPARATUS FOR ENCODING AND DECODING A SUPPLEMENTARY SIGNAL

BACKGROUND OF THE INVENTION

1. Technical Field of the Invention

The present invention relates to radio telephone systems. More particularly, the present invention relates to an improved method for encoding and decoding a supplementary signal so that greater amounts of data may transmitted by a radio call without any reduction in performance of nearby radio calls.

2. Description of the Related Art

Communication systems take many forms. In general, the purpose of a communication system is to transmit information-bearing signals from a source, located at one point, to a user destination, located at another point some distance away. A communication system generally consists of three basic components: transmitter, channel, and receiver. The transmitter has the function of modulating the information signal into a form suitable for transmission over the channel. The function of the channel is to provide a physical connection between the transmitter output and the receiver input. The function of the receiver is to demodulate the received signal so as to produce an estimate of the original information signal.

Analog and digital transmission methods are used to transmit a information signal over a communication channel. The use of digital methods offers several operational advantages over analog methods, including but not limited to: increased immunity to channel noise and interference, flexible operation of the system, common format for the transmission of different kinds of information signals, improved security of communication through the use of encryption, and increased capacity.

To transmit a information signal (either analog or digital) over a bandpass communication channel, the information signal must be manipulated into a form suitable for efficient transmission over the channel by modulating the information signal. Modulation involves varying some parameter of a carrier wave in accordance with the information signal in such a way that the spectrum of the modulated wave matches the assigned channel bandwidth. At the receiver point of the communication channel, a receiver re-creates the original information signal from a degraded version of the transmitted signal by a process known as demodulation.

For multiplexed communication systems such as a code division multiple access (CDMA) system, the system typically consists of many remote units (i.e., subscriber units). Each subscriber unit requires a communication channel for short or discrete intervals of time rather than continuous service on a communication channel at all times. The discrete intervals of time are known as packets or power control groups. Therefore, communication systems have been designed to incorporate the characteristic of communicating with many remote units for brief intervals of time on the same communication channel.

A Direct Sequence (DS) Code Division Multiple Access (CDMA) system is a cellular system where all subscriber units transmit information signals on the same frequency band simultaneously. Similarly, base stations transmit information signals intended for a particular subscriber unit by transmitting the information signals on the same frequency band as base station originated transmissions to other subscriber units. By necessity, the transmitted bandwidth from a base station is much larger than the information rate of the information signal, i.e. carrier bandwidth is large compared to the message bandwidth.

In digital communications, and CDMA communication systems in particular, communication clarity and throughput is controlled by the amount of data that can be transmitted over a channel. For every increase in the data rate transmitted over a channel, there is a corresponding increase in either the quality of a call (e.g. voice) or the number of simultaneous calls that are carried by a channel. Sometimes an increase in data rate per channel can realize both improved quality and call carrying capacity. Any method that improves the data rate per channel is useful where the number of channels are scarce.

In cellular systems, including CDMA, there is a limited number of channels available to carry a transmission. When many transmissions occur on a cellular system, some of the transmissions will occur on the same channel. A way to limit interference between cells that share the same frequency band is to reduce the power of each transmitter according to the power received at the receiver. Consequently, power control must be implemented to adjust the transmitter to maintain a constant received signal strength at the receiver. Any method that improves the ability to maintain constant levels of received signal strength is useful.

DETAILED DESCRIPTION OF THE PREFERRED EMBODIMENTS

Figure 1:
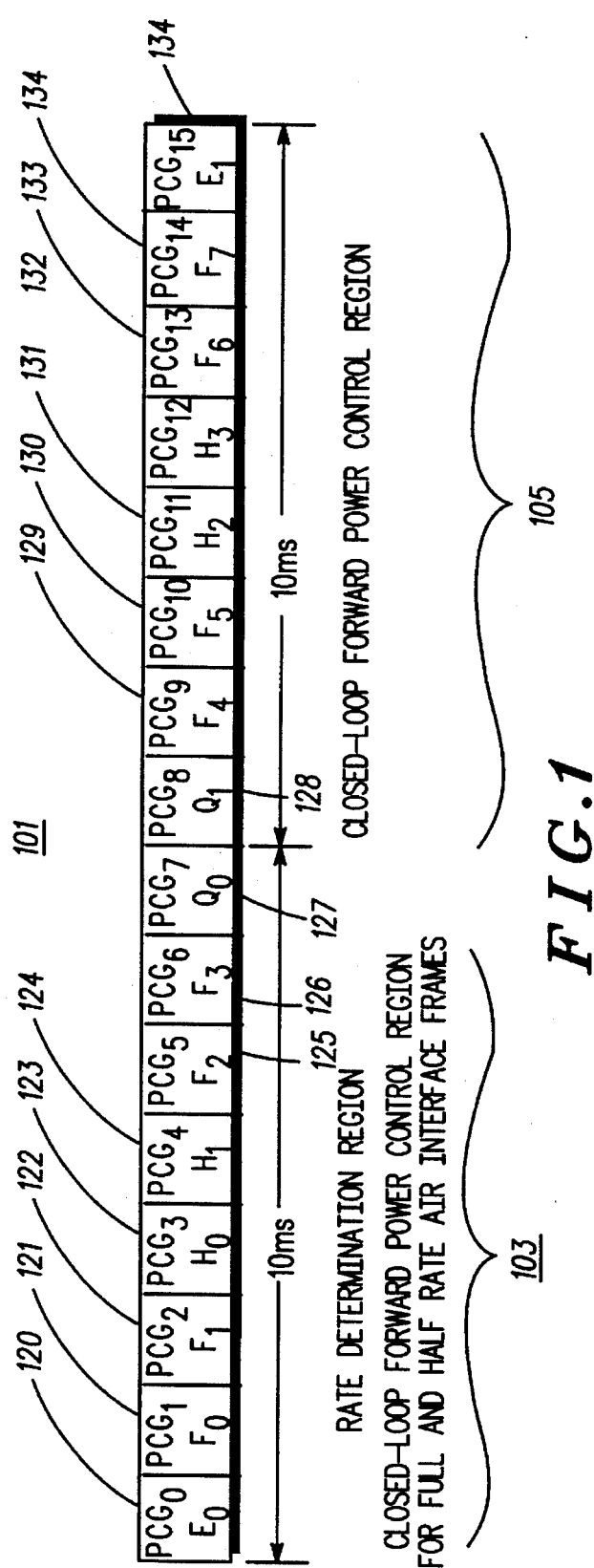
FIG. 1 illustrates a frame of power control groups (PCG) of a CDMA system of the present invention

In any kind of cellular telecommunication system, obtaining the greatest data throughput for an allocated frequency is a chief goal. The data can take many forms, but typically it consists of a human voice that is digitally encoded as well as information such as control information. If a supplementary signal were encoded on a signal carrying a data source, then the supplementary signal could provide additional throughput to increase the data rate for the data source. In the instance of voice data by itself, a higher voice baud rate could be transmitted by sending some voice on the supplementary signal which would result in the receiver more accurately reproducing human speech. A supplementary signal encoded on a source signal could be used to carry electronic mail messages using any one of the many electronic mail protocols commonly in use. Facsimile and other graphical data could be carried by a supplementary signal which could be used as the subject of immediate conversation for the user of the cellular subscriber unit. Commands could be transmitted on the supplementary signal that would enable hand-offs of the subscriber unit from one cell controlled by a base site transceiver to another cell controlled by another cellular transceiver. These and other possibilities exist to increase the information conveyed by a cellular telephone call provided with the apparatus of the present invention.

The ability to transmit and receive a supplementary signal depends on the non-coherency of a cellular base site receiver as related to the subscriber unit transmitter. Non-coherency is the property where a receiver attempts to match the frequency of a transmitter, but not the phase. It does so through an internal oscillator which may vary from the oscillator of the transmitter on the order of a few Hertz. In contrast with non-coherency, coherency requires a signal between a transmitter and a receiver separate from and in addition to a communication signal. This signal is demodulated by the receiver and provides an oscillator frequency so that sampling and other operations occur in lockstep with the transmitter.

In the non-coherent case, signals, such as the in-phase and quadrature phase signals, are received at the base site with very slight changes in frequency caused by Doppler effects and the error in synchronization that is inherent to generating oscillating references independent of the transmitter, also known as frequency offset. As a transmitter or receiver moves through uneven terrain, a transmitted RF signal may be reflected off objects such that there are rapidly alternating periods of constructive and destructive interference between the signals that travel different paths. Over the time period of a modulation signal, the demodulated signal might move out of phase by a few degrees with reference to an oscillator frequency generated internal to the receiver. It is when the demodulated signal moves significantly in phase, more than is attributable to Doppler and frequency offset, that provides the means to encode a supplementary signal. Ideally the presence of a 180 degree phase change at the receiver could serve to encode a "one" and the absence of a significant phase change could encode a "zero" on a supplementary signal.

As a result of the freedom to read phase changes over intervals between demodulated symbols, an inversion of the in-phase and quadrature phase signals by 180 degrees can be detected and used as the basis for carrying a supplementary signal.

Particularly in CDMA systems where a cellular transmitter moves relative to a cellular receiver it is desirable to maintain a constant power level as received at the receiver. This is accomplished in the present invention by reducing the transmitted power when distances are relatively small and increasing transmitted power when distances are greater. Where a cellular system consists of stationary base stations and mobile subscriber units, control of the base station transmitter power is managed and initiated by each subscriber unit by transmitting power adjustment commands to the base.

The one-way communication from subscriber unit to base station is the reverse link. Conventional reverse links transmit a stream of digitally encoded radio frequency (RF) packets which consist of digitally encoded voice packets interspersed with digitally encoded power adjustment commands. The power adjustment commands control the power of the forward link transmission, or the signal transmitted from base station to subscriber unit.

This method of encoding the reverse link to control the forward link power achieves its goal of stabilizing forward link received power. However, the volume of power control packets transmitted on the reverse channel is increased at the expense of fewer voice packets. The result of a diminishing voice packet volume is a corresponding reduction in voice quality as received and demodulated at the base station. In a conventional system, only voice or control information is transmitted at a particular instance. Both cannot be transmitted during a power control group. It would be better if both voice and control information could be transmitted at the same time. It would be better if voice were transmitted so that it is received without interruption by packets of control information indicating how to adjust power output.

Conventional Code Division Multiple Access (CDMA) systems may transmit data for a single call reverse link at one of four different rates: 9600 bits per second (bps), 4800 bps, 2400 bps and 1200 bps. Any information, such as voice or power commands, is constrained to the limits of these data rates. The rates and the arrangement of data packets in a channel is defined in TIA/EIA/IS-95, "Mobile Station—Base Station Compatibility Standard for Dual-mode Wideband Spread Spectrum Cellular Systems", Telecommunications Industry Association, July 1993, hereinafter referred to as IS-95. Other CDMA standards may be developed which require calls to be encoded at a different set of rates. In any case, a transmitter and receiver equipped to communicate using a supplementary signal and a source signal will be able to combine the throughput of both to obtain an effectively higher rate of data packets.

The IS-95 standard defines a frame to be a 20 ms burst of digitally encoded data consisting of 16 power control groups (PCG). Each power control group consists of six 64-ary Walsh codes. Since a 64-ary Walsh code carries six bits of baseband data, the conventional Walsh coded IS-95 frame may carry 6*6*16 bits, for a total of 576 baseband bits or code symbols. The 576 coded bits are convolutionally decoded by a rate ⅓ decoder to obtain 192 information bits. The 192 information bits per each 20 ms frame is the limiting factor for reverse channel data rates, and consequently the combined voice quality and power control of each CDMA call.

The supplementary signal of the present invention will now be further described by an example for performing reverse channel power control in a CDMA system, such as IS-95. The invention shows a way to encode as many as 96 additional data bits, thus achieving higher data throughput than conventional encoding methods. Differentially coherent modulation is the encoding method that accomplishes the higher data throughput. The throughput of the total link may be increased by nearly 50% if a high rate convolutional encoder/decoder is incorporated for a supplementary channel. Such supplementary signal can be used, for instance, for reverse channel power control in a CDMA system such as IS-95 without reduction in system channel capacity or increase in adjacent channel interference. Further, the reduced degradation of voice quality due to the IS-95 reverse channel dim and burst or blank and burst power control is avoided.

A variable rate voice coder provides four possible data rates for each 20 ms voice frame. The vocoder produces frames with transmit data rates of 9600, 4800, 2400, and 1200 baud depending on the characteristics of the speech samples for each frame. The first and slowest data rate is called the eighth rate, which in the instance for IS-95 systems is 1200 baud. The rate double the eighth rate is the quarter rate. The rate double the quarter rate is the half rate. The rate double the quarter rate is the full rate.

The mobile transmitter of the present invention provides a second communication channel or supplementary signal, operating with differing signaling characteristics than the vocoder produced data stream. This second communication channel preferably carries power control commands. A second communication channel that carries power control commands is comprised of a series of power control groups.

Conventional communication systems transmit power control commands on the same channel as the voice data by a technique known as dim and burst. Use of the dim and burst technique requires that, at the time which power control information is transmitted, the voice data rate be decreased in half and that power control commands be interleaved with the voice data such that the power control data is transmitted at the same rate as the data rate. When the power commands are finished, the voice data rate is restored to its original rate. Another technique used is blank and burst. Using that technique, during intervals where power commands are sent, the voice data is discarded entirely and not transmitted. In each technique, some voice data throughput must be sacrificed in order to transmit power control commands, which results in poorer voice quality.

FIG. 1 shows an IS-95 standard CDMA frame 101. In a 20 ms IS-95 CDMA frame, there are 16 power control groups (PCG) transmitted in sequence. A power control group consists of a series of six Walsh encoded symbols. Each power control group is allocated signal energy according to the current rate of vocoder transmission, in combination with the data burst randomization bits (DBR) described in IS-95. The sequence of power control groups 120–135 is the same in the present invention as in the sequence used in conventional CDMA systems.

The first eight power control groups 120–127 are the rate determination region 103 of the 20 ms frame. The subsequent eight power control groups 128–135 are the closed loop forward power control region 105.

The order of power control groups as shown in FIG. 1 is one example of the many possible arrangements that IS-95 standard allows. The order changes depending on the IS-95 standard defined data burst randomization (DBR). In FIG. 1, the eighth rate power control groups 120 and 135 correspond respectively to the labels E0 and E1. The quarter rate power control groups 120, 127, 128, 135 correspond respectively to the labels E0, Q0, Q1 and E1. The half rate power control groups 120, 123, 124, 127, 128, 131, 132 and 135 correspond respectively to the labels E0, H0, H1, Q0, Q1, H2, H3, E1. The full rate power control groups 120–135 correspond respectively to the labels E0, F0, F1, H0, H1, F2, F3, Q0, Q1, F4, F5, H2, H3, F6, F7, and E1.

When the vocoder transmits at eighth rate, only the eighth rate power control groups have energy. When the vocoder transmits at quarter rate, only the eighth rate power control groups and quarter rate power control groups have energy. When the vocoder transmits at half rate only the eighth rate power control groups and quarter rate power control group and half rate power control groups have energy. When the vocoder transmits at full rate, all 16 power control groups have energy.

The techniques of dim and burst and blank and burst each rely on allocating at least one power control group (and as many as eight power control groups) of a frame to contain only power control information. Consequently, fewer power control groups can be used to carry voice information. The present invention, by increasing the collective throughput of the voice information and the supplementary signal, reduces the need to diminish voice information to carry power control groups.

One advantage the present invention has over the previously mentioned techniques is that a modulator of the present invention can encode and transmit a power command every 20 ms with no impact to the quality of voice being transmitted. The previously mentioned techniques transmit power commands with a much longer period between them than that of the present invention. Another advantage of the present invention is that blank and burst techniques typically require Open Systems Interconnection (OSI) model layer 3 processing provided by a geographically remote processor. The present invention accomplishes forward link power control by layer 1 or physical layer processing local to the base station, thereby removing any delays caused by layer 3 processing.

Each power control group is comprised of six Walsh codes. Each Walsh code can be encoded by binary addition by binary adder 209 with a supplementary signal 211 as will be later described with reference to FIG. 2. This supplementary signal 211 is a differentially encoded signal. The differentially encoding technique creates a waveform by encoding information in the signal transitions. A symbol "one" is encoded with a transition from a low voltage to a high voltage, or a transition from a high voltage to a low voltage. A symbol "zero" is encoded by the absence of a change in voltage. A supplementary signal transition may occur during the end of one Walsh code and the beginning of a subsequent Walsh code. Binary adder 209 preferably performs modulo-two addition and may be substituted with an XOR device. For example, an unchanged Walsh code, followed by an inverted Walsh code is the representation of a "one" on the supplementary signal. Another example is an unchanged Walsh code followed by an unchanged Walsh code followed by an inverted Walsh code, which is the representation of a "zero" followed by a "one" on the supplementary signal.

Ideally an inversion operation will provide a 180 degree phase change in in-phase and quadrature waveforms. Depending upon the quality of the channel, other phase changes may serve to encode a "one" or a "zero". Since inverting the Walsh bits changes the effective transmit phase by 180 degrees, the Walsh symbols are still orthogonal, and the phase change has no effect on the existing non-coherent 64-ary demodulator. That is there is no increase in transmit bandwidth, no increase in required transmit power, and no increase in the co-channel interference.

Fortunately, where a transmitter and receiver are non-coherent, the receiver can demodulate Walsh symbols although the phase for each chip of the Walsh symbol may vary from a previous identically encoded chip. The significant phase shift provided by inversion at the transmitter takes full advantage of the non-coherent aspect of some transmitter/receiver pairs. Since the phase shift that occurs from comparing chips between a Walsh symbol and the successive Walsh symbol is small, but for any inversion caused at the transmitter, a significant phase shift can confidently be decoded into a "one" or a "zero". Comparisons are made between a Walsh code and a successive Walsh code such that each chip is compared in sequence to the chip of the successive Walsh code. If the chip comparisons consistently indicate a significant phase shift across all symbols of the Walsh codes, the two Walsh codes are determined to encode a bit, i.e. either "one" or "zero".

In the preferred embodiment, power adjustment commands and rate information are encoded on the supplementary signal 211. The first power control group each of the eighth rate, quarter rate and half rate power control groups is encoded with one of two differential encoded sequences such that rate information is transmitted. The rate information is encoded as all ones or all zeros to enhance the robustness of rate detection. A rate ending technique for the supplementary signal is shown in the table below. In the table below, xxxxx represents a power control group which contains no energy, i.e. the transmitter is gated off during those power control groups. The columns headed by E0, Q0 and H0 respectively represent power control groups 120 (E0), 127 (Q0) and 123 (H0) illustrated in FIG. 1.

| Vocoder Tx Rate | E0 | Q0 | H0 | Remaining energized power control groups available for power step differential encoding |
|---|---|---|---|---|
| 1200 | 11111 | xxxxx | xxxxx | 1 |
| 2400 | 00000 | 11111 | xxxxx | 2 |
| 4800 | 00000 | 00000 | 11111 | 5 |
| 9600 | 00000 | 00000 | 00000 | 12 |

Depending on the rate that is desired to be transmitted, the rate information is differentially encoded into the first power control group that is labeled for that rate (i.e. E0 in the case of eighth rate, Q0 in the case of quarter rate or H0 in the case of half rate). In the instance of the full rate, the F0 power control group may be preserved for differentially encoding power steps (i.e. the strength of the power adjustment) while the E0, Q0 and H0 power control groups carry the differential rate information. Two power adjustment commands: power-up and power-down that can be used are the sequences 11111 and 00000. These sequences are differentially encoded to provide the sequences 010101 and 00000 respectively. Depending on the initial reference bit, the sequence 11111 can be differentially encoded to provide a 101010 sequence, where the first bit is a reference bit, 1. Depending on the initial reference bit, the sequence 00000 can be differentially encoded to provide a 111111 sequence, where the first bit is the reference bit, 1.

Ordinarily, one would expect that if the 9600 bps rate carried a rate command in the pattern of the other lower rates, then the F0 power control group would contain a five-bit rate command. However, since only the 4800 rate and 9600 rate energize all three E0, Q0 and H0 power control groups, and since, in the 9600 rate, E0, Q0 and H0 contain identical five-bit rate commands, it is known that the 4800 rate is not the correct rate, and that 9600 is the correct rate. In the case of receiving a 00000 in each of E0, Q0 and H0, if the same pattern were followed, then a 11111 would be expected in the F0 power control group. Since the rate is certain after demodulating E0, Q0 and H0, it is pointless to encode F0 with rate information. Instead, the F0 power control group can be allocated to the task of carrying a power step.

The remaining energized power control groups, aside from E0, Q0 and H0, contain power steps. A power step indicates that the forward link transmitter should adjust power by a predetermined amount. The power step indicates either power-up or power-down depending on if 11111 or 00000 is demodulated, respectively. For eighth rate and quarter rate, the power steps occur in the closed-loop forward power control region 105. Consequently, those power steps control the power that the base transmits on the succeeding 20 ms frame. For the half rate, the power steps are encoded in power control groups that occur in both the rate determination region 103 and the closed-loop forward power control region 105. As a result, power control may be performed on a 10 ms basis at the base. In the full rate case, a power control group occurs in every 2.5 ms interval. Consequently, power control occurs in each 2.5 ms interval.

Figure 2:
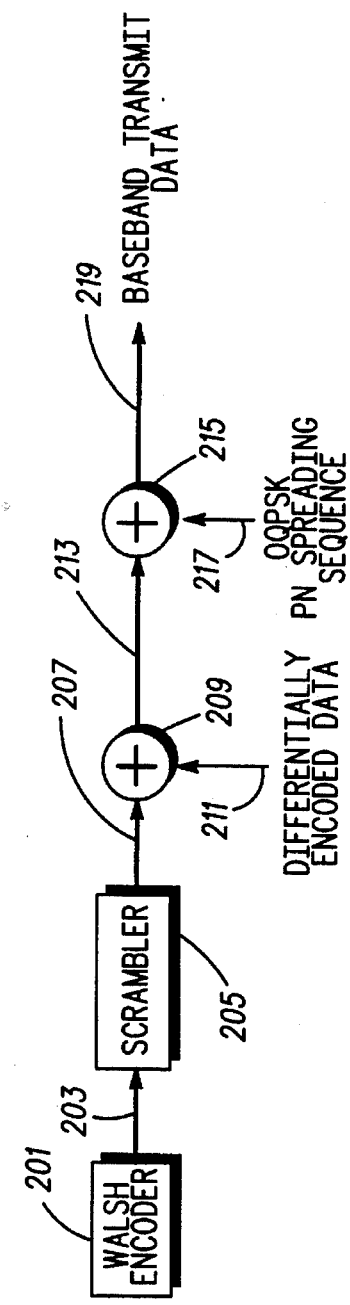
FIG. 2 illustrates a preferred embodiment differential encoding transmitter according to the present invention.

FIG. 2 illustrates a transmitter having multiple encoders. In a preferred embodiment of the present invention, the transmitter of FIG. 2 would be used in the subscriber unit of a CDMA cellular radiotelephone system. A Walsh encoder 201 non-coherently modulates data to be transmitted, such as, for example, voice data or computer data. The data modulated by the Walsh encoder 201 is preferably convolutionally encoded to provide for error correction. The Walsh encoder 201 is a M-ary Walsh encoder which can be a 64-ary Walsh encoder. This 64-ary Walsh encoder transmits 64 chip Walsh symbols 203 at 4800 symbols per second. The Walsh symbols 203 are input to a scrambler 205 to produce scrambled Walsh symbols 207.

A phase modulator 209 performs differentially coherent modulation of non-coherent data 207 and a supplementary signal 211. The supplementary signal 211 is thus overlayed on the data 207 by differential encoding. Because the data 207 is non-coherent data, the phase modulator 207 performs differentially coherent modulation when overlaying the supplementary signal 211. The Walsh encoder 201 encodes data without a requirement for coherency in the signal. A non-coherently encoded signal, such as the Walsh symbols 203, does not require a coherent demodulator for decoding. Therefore, a receiver which receives the encoded Walsh symbols 203 does not need to be coherent. As earlier described, non-coherency is the property where a receiver only strives to match the frequency of a transmitter, but not match the phase of a transmitter. Because non-coherent data can be received without phase adjustment by a receiver, phase information does not need to be conveyed from the transmitter to the receiver for phase lock and a less computationally intense receiver can be used.

The present invention sends additional information by differential coherent modulation. In the differential coherent modulation, non-coherently encoded data is transmitted together with differentially encoded data. However, the communication link between the transmitter and receiver can still remain non-coherent after the differentially coherent modulation. This is because the phase between neighboring Walsh symbols as received by the receiver does not significantly change over the communications link. The receiver only needs to detect differences in phase between the previous Walsh symbol and a current Walsh symbol to demodulate the supplemental data. Thus, a differentially coherent modulation can be used at the transmitter, and the receiver does not need to be coherent with the transmitter.

The phase modulator 209 preferably performs the differentially coherent modulation using a binary adder for combining the supplementary signal 211 with the scrambled Walsh signals 207. The binary adder performs modulo-two addition and can be most simply implemented by an XOR gate. The supplementary signal 211 can carry different types of information such as supplemental data or voice information. Additionally, the supplementary signal 211 can carry control information such as hand-off commands or power control commands. Power control commands are particularly pertinent to reverse-channel power control in a CDMA system such as the IS-95 specification. In the current IS-95 specification for CDMA, non-coherent Walsh encoded symbols are transmitted on a non-coherent communications link. The Walsh encoded symbols are then either blanked out or dimmed to transmit power control groups from a subscriber unit to a base station to perform power control. The present invention allows for differentially coherent modulation of the power control commands in the previously unused capacity of non-coherent Walsh symbols to provide power control without the need to blank or dim.

In a CDMA system, the differentially coherent encoded data 213 must be encoded for the required spread spectrum transmission. A mixer 215 accepts a pseudo-noise (PN) spreading sequence 217 to modulate and provide an offset quadrature phase shift keyed signal 219. This signal 219 is then transmitted by the transmitter after low pass filtering, amplification and radiation by an antenna. Depending on the type of transit fission used, either frequency allocated channels or spread spectrum channels, any variety of complex number modulator may be substituted for the mixer 215 or the mixer 215 could be eliminated.

Figure 3:
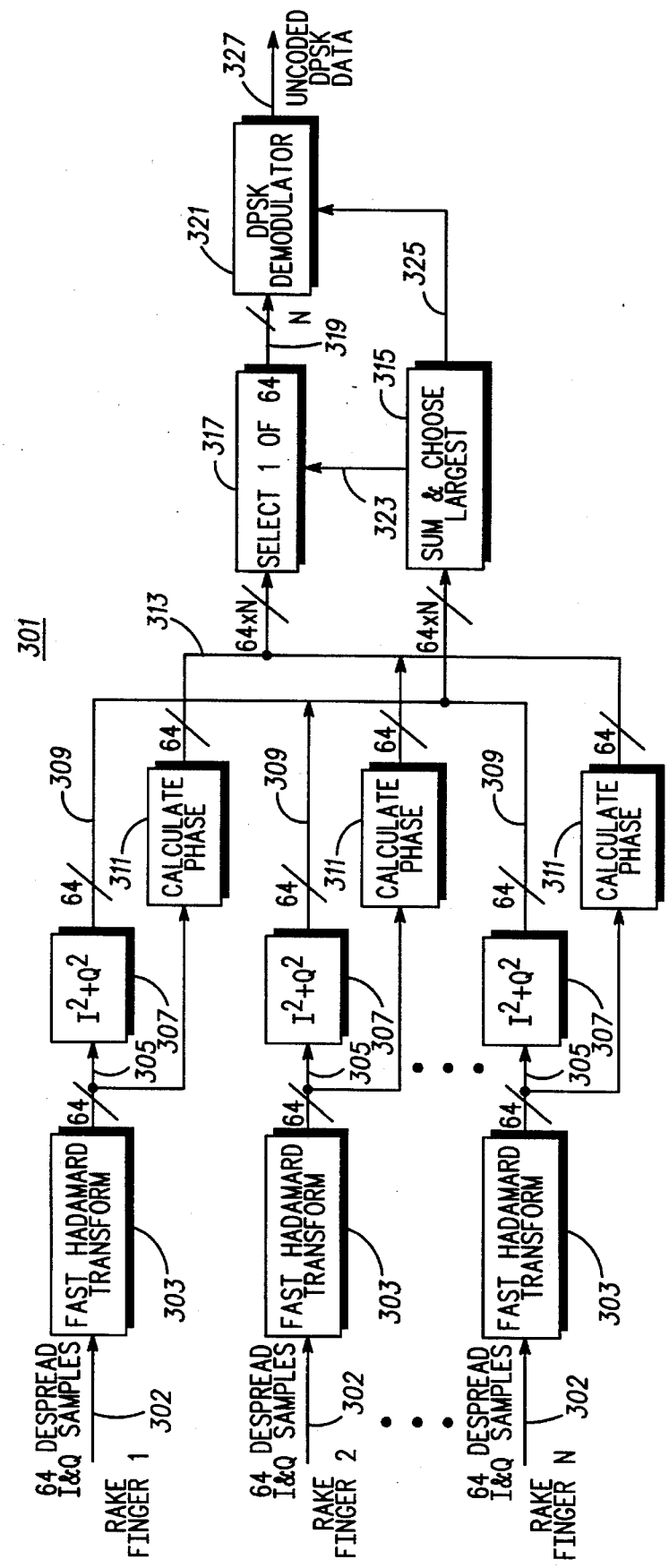
FIG. 3 illustrates a preferred embodiment differential decoding receiver according to the present invention.

FIG. 3 shows a receiver 301 for receiving a supplementary signal and data such as voice frames. In the CDMA power control system, the receiver 301 would be a base station which receives reverse channel power control commands on the supplementary signal. The base station demodulator receives and operates upon the reverse link of a CDMA communication, that is the link from the subscriber unit to the base station. A plurality of fingers of a Rake receiver process a plurality of despread in-phase and quadrature samples 302. The number of fingers of the Rake receiver is represented by N. Each Rake finger samples a different version of the received signal due, for example, to a delay provided by a multipath signal. Despread data is then descrambled to produce the despread in-phase and quadrature samples 302. The preferred embodiment performs correlation on the in-phase and quadrature samples 302 with a Fast Hadamard Transform algorithm (FHT) 303 to produce a set of 64 complex numbers 305 for each Rake finger. It will be appreciated by one skilled in the art that other transforms may be used to accomplish the same result, such as a Fast Fourier Transform.

The squared magnitude of the complex number is determined by adding the square of the imaginary part to the square of the real part. The 64 complex numbers 305 are input to the squared magnitude determination circuit 307. The squared magnitude determination circuit 307 outputs 64 real energy values 309 which are combined with all the 64 real energy values 309 to be input to the sum and selection circuit 315. Sum and selection circuit 315 adds N real energy values for each of the 64 possible Walsh indices. The Walsh code having the greatest sum is selected. The 6-bit Walsh index 323 that corresponds to the selected Walsh code is output to the phase selector 317. Furthermore, the N real energy values 325 that correspond to the Walsh code having the greatest sum is output to differential supplementary signal demodulator 321 by the sum and selection circuit 315.

Phase determination circuit 311 accepts the 64 complex numbers 305 as input. Phase determination circuit 311 compares each of the 64 complex numbers to each of the 64 complex numbers corresponding to the previously sampled set of 64 despread in-phase and quadrature values in order to provide 64 delta phase values 313 which identify the differences in phase from one Walsh code to the next. The phase differences are available provided that the receiver is non-coherent. The 6-bit Walsh index 323 is used by phase selector to select one of the delta phase values 313 from each of the Rake fingers that corresponds to the 6-bit Walsh index. Consequently, phase selector 317 outputs N phase values 319.

Where there are N Rake fingers, a differential supplementary signal demodulator 321 is used to determine a weighted delta phase, or $\Delta\Phi_{COMB}$. The weighted delta phase is important because the choice of decoding a "one" or a "zero" over a time interval is thereby obtained. The differential supplementary signal demodulator 321 accepts the N energy values 325 and the N phase values 319 and applies the following maximum ratio combining equation to determine the weighted delta phase of the current Walsh code demodulated by each Rake finger and the predecessor Walsh code demodulated at each Rake finger:

$$\Delta\Phi_{COMB} = \frac{|\Delta\phi_0| E_0 + |\Delta\phi_1| E_1 + |\Delta\phi_2| E_2 + \ldots |\Delta\phi_N| E_N}{E_0 + E_1 + E_2 + \ldots E_N}$$

Wherein each of the N real energy values 325 is represented by $E_0$ through $E_N$, and wherein each of the delta phase values 313 is represented by $\Delta\Phi_0$ through $\Delta\Phi_N$. The operation may be carried out by a central processing unit (CPU) that implements addition, multiplication and division operations. If $\Delta\Phi_{COMB}$ is greater then 90 degrees, then a "one" value is output as uncoded supplementary signal data 413, otherwise a "zero" is output as uncoded supplementary signal data 413. If the delta phase is greater than 90 degrees, the supplementary signal demodulator 321 treats the delta phase as a transition on the unmodulated supplementary signal, and outputs a "one", otherwise a "zero" is output as supplementary signal data 327.

Figure 4:
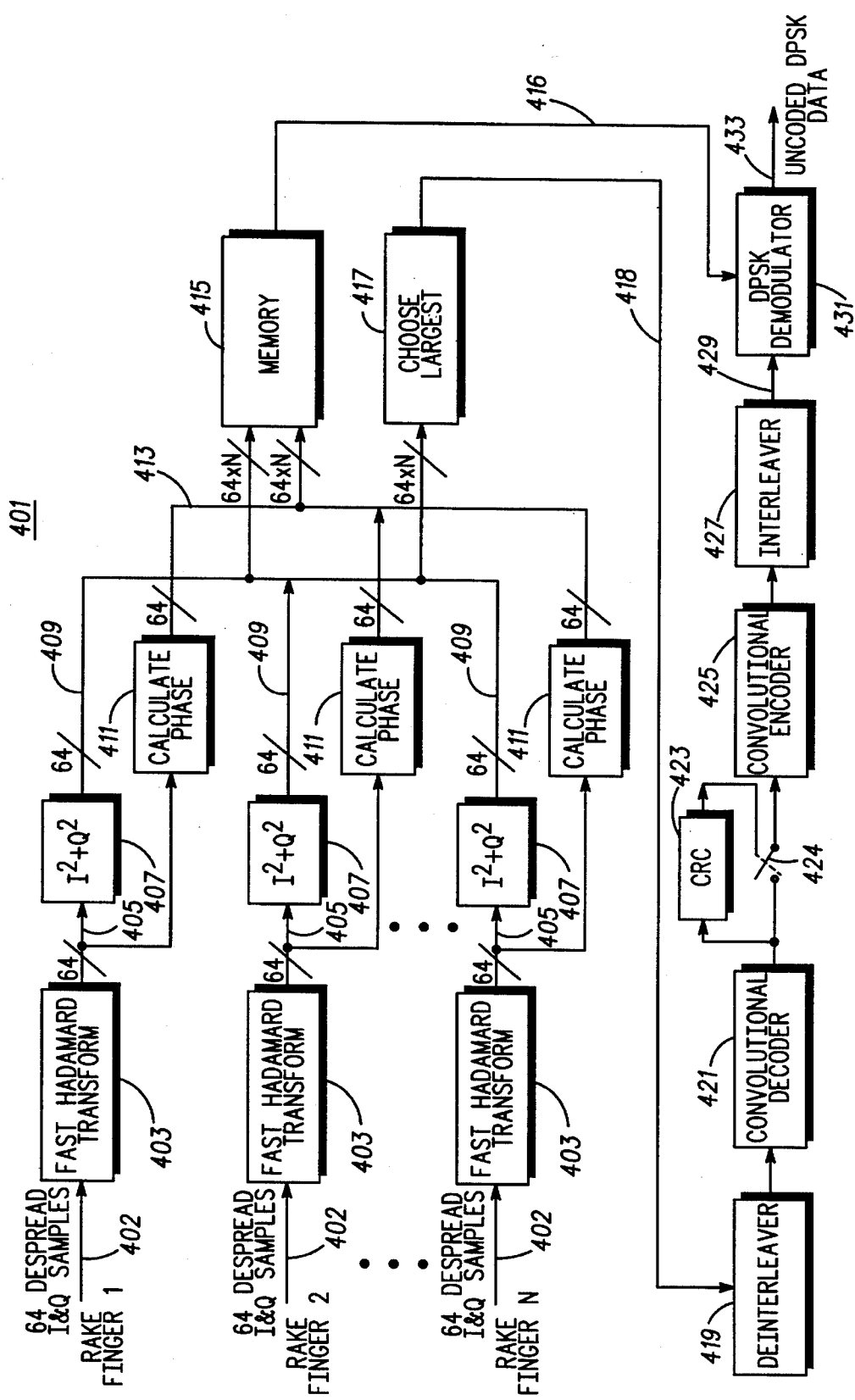
FIG. 4 illustrates a alternate preferred embodiment differential decoding receiver having error correction according to the present invention.

FIG. 4 shows an alternate preferred embodiment receiver. The advantage of the alternate preferred embodiment receiver is that error correction is performed on the 6-bit Walsh indices 429 so that differential decoding only occurs when a correct frame of Walsh indices is demodulated. This reduces the noise that appears in the uncoded supplementary signal 327 of FIG. 3.

In FIG. 4 the 64 real energy values 409 correspond to the 64 real energy values 309 of FIG. 3, that is, the demodulation of the preferred embodiment receiver and the alternate preferred embodiment receiver is the same up to the decoding of the real energy values. Similarly, in FIG. 4, the 64 delta phase values 413 correspond to the 64 delta phase values 313 of FIG. 3.

The 64 real energy values 409 are stored in memory 415. Also, the 64 delta phase values 413 are stored in memory 415. The purpose of storing the delta phase values and real energy values is so that a error correction may be performed on the decoded Walsh index sequence and the phase and energy information be used after error correction. An arrangement of the memory 415 could be a first in first out register (FIFO). The memory 415 could also be implemented with random access memory (RAM). The memory stores the delta phase values and the real energy values long enough so that the Walsh index sequence 418 may propagate through the deinterleaver 419, convolutional decoder 421, the cyclical redundancy check (CRC) circuit 423, the convolutional encoder 425, and the interleaver 427. The output from memory 415 is in the form of 64 delta phase values for each of the Rake fingers and 64 real energy values for each of the Rake fingers. For example, if the Rake were implemented with 4 fingers, 64*4 delta phase values would be read from memory 415 by the supplementary signal demodulator 431 at the same time. Using the same example, 64*4 real energy values would be read from memory 415 by the supplementary signal demodulator 431 at the same time.

The 64 real energy values 409 from each Rake finger are input to the sum and selection circuit 417. Sum and selection adds N real energy values 64 times such that a sum is determined for each of the 64 Walsh codes. The Walsh code having the greatest sum is selected. The 6-bit Walsh index sequence 418 that corresponds to the selected Walsh code is output to the deinterleaver 419 which deinterleaves the Walsh index stream and provides output to the convolutional decoder 421. The convolution decoder 421 may be configured to have a constraint length 9 and rate of ⅓. Convolution decoder 421 decodes the input to provide information data (which could comprise voice, or e-mail) which is checked for correctness by a cyclical redundancy check (CRC) circuit 423. If the information data (which could comprise voice, or e-mail) is correct, it is output by switch 424 to convolution encoder 425 which is configured to have the same constraint length and rate as convolution decoder 421. The signal output from convolution encoder 425 is interleaved by interleaver 427 to produce a corrected Walsh index sequence 429.

Where there are N Rake fingers, a supplementary signal demodulator 431 combinet circuit is used to determine a weighted delta phase, or $\Delta\Phi_{COMB}$. The weighted delta phase is important because the choice of decoding a "one" or a "zero" over a time interval is thereby obtained. Walsh index sequence 429 is provided to supplementary signal demodulator 431 so that one of the 64 delta phase values is selected by sum and selection circuit 417 for each of the Rake fingers and one of the real energy values is selected for each of the Rake fingers. Where there are N Rake fingers, N delta phase values ($\Delta\Phi_N$) and N real energy values ($E_N$) are provided to the maximum ratio combining operation of the supplementary signal demodulator 431 as follows:

$$\Delta\Phi_{COMB} = \frac{|\Delta\phi_0| E_0 + |\Delta\phi_1| E_1 + |\Delta\phi_2| E_2 + \ldots |\Delta\phi_N| E_N}{E_0 + E_1 + E_2 + \ldots E_N}$$

Each of the N real energy values is represented by $E_0$ through $E_N$. Each of the delta phase values is represented by $\Delta\Phi_0$ through $\Delta\Phi_N$. The operation may be carried out by a CPU that implements addition, multiplication and division operations. If $\Delta\Phi_{COMB}$ is greater then 90 degrees, then a "one" value is output as uncoded supplementary signal 413, otherwise a "zero" is output as uncoded supplementary signal 413.

The operation may be carried out by a CPU that implements addition, multiplication and division operations. In order to perform hard decision decoding, if $\Delta\Phi_{COMB}$ is greater than 90 degrees, then a "one" value is output as uncoded supplementary signal 413, otherwise a "zero" is output as uncoded supplementary signal 413. Alternatively, a soft decision value may be generated by the demodulator. The soft decision values would represent a plurality of quantized levels measuring the strength of the confidence in detecting a "one" or a "zero". A strong "zero" would correspond to phase shifts significantly close to 0 degrees. A strong "one" would correspond to a phase shifts significantly close to 180 degrees. Error correction circuitry following the supplementary signal demodulator 431 could then take advantage of the quantized levels to further enhance the performance of the link. Although the invention has been described and illustrated in the above description and drawings, it is understood that this description is by example only and that numerous changes and modifications can be made by those skilled in the art without departing from the true spirit and scope of the invention.

What is claimed is:

1. A differential coherent modulation and demodulation system, comprising:

a non-coherent modulator for non-coherently modulating source data to provide non-coherently modulated data;

a phase modulator operatively connected to said non-coherent modulator for phase modulating a supplementary signal on the non-coherently modulated data to provide coded data;

a transmitter operatively connected to said phase modulator for transmitting the coded data;

a Rake receiver having a plurality of receiver paths each for receiving the coded data from said transmitter to provide received coded data;

a plurality of non-coherent demodulators, each of said non-coherent demodulators operatively connected to one of the receiver paths of said Rake receiver for demodulating the received coded data to provide the source data using a fast transform circuit; and a maximum ratio phase combiner circuit operatively connected to said fast transform circuit of each of said plurality of said non-coherent demodulators to receive the symbols and provide the supplementary signal based on a selected output of the receiver paths of said Rake receiver.

2. A system according to claim 1, wherein said non-coherent modulator comprises a Walsh modulator for modulating the source data using a Walsh code.

3. A system according to claim 1, wherein said system is a CDMA cellular radiotelephone system, wherein said transmitter comprises a spread spectrum transmitter; and wherein said receiver comprises a spread spectrum receiver.

4. A system according to claim 3, further comprising a reverse channel command generating circuit operatively connected to said phase modulator for generating commands to be sent by said phase modulator as the supplementary signal.

5. A system according to claim 4, wherein said reverse channel command generating circuit is operatively connected to said phase modulator for generating handoff commands to be sent on a reverse channel from a remote unit to a base station.

6. A system according to claim 4, wherein said reverse channel command generating circuit is operatively connected to said phase modulator for generating power control commands to be sent on a reverse channel from a remote unit to a base station based on signal quality measurements to control the transmit power of the base station.

7. A differential coherent modulation and demodulation system, comprising:

a non-coherent Walsh modulator for non-coherently modulating source data using Walsh code to provide non-coherently modulated data;

a phase modulator operatively connected to said non-coherent Walsh modulator for phase modulating a supplementary signal on the non-coherently modulated data received from said non-coherent Walsh modulator to provide coded data;

a transmitter operatively connected to said phase modulator for transmitting the coded data received from said phase modulator;

a receiver for receiving the coded data from said transmitter to provide received coded data;

a fast Hadamard transform circuit operatively connected to said receiver for demodulating the received coded data to provide a plurality of complex-number symbols;

a magnitude determination circuit operatively connected to said fast Hadamard transform circuit for determining a magnitude of each of the complex-number symbols, choosing a complex-number symbol having a largest magnitude and outputting the magnitude of the chosen complex-number symbol as the source data; and a phase determination circuit operatively connected to said magnitude determination circuit for determining a phase of the complex-number symbol having the largest magnitude to output the phase as the supplementary signal.

8. A differential coherent demodulator, comprising:

a Rake receiver having a plurality of receiver paths each for receiving coded data from a transmitter to provide received coded data;

a plurality of non-coherent demodulators, each of said non-coherent demodulators operatively connected to one of the receiver paths of said Rake receiver to demodulate the received coded data and to provide the source data using a fast transform circuit; and a maximum ratio phase combiner circuit operatively connected to said fast transform circuit of each of said plurality of said non-coherent demodulators to receive the symbols and provide the supplementary signal based on a selected output of the receiver paths of said Rake receiver.

9. A demodulator according to claim 8, wherein said maximum ratio phase combiner circuit provides the supplementary signal including power control commands.

10. A differential coherent demodulator, comprising:

a receiver for receiving coded data from a transmitter to provide received coded data;

a fast Hadamard transform circuit operatively connected to said receiver to demodulate the received coded data and provide a plurality of complex-number symbols;

a magnitude determination circuit operatively connected to said fast Hadamard transform circuit to determine a magnitude of each of the complex-number symbols, choose a complex-number symbol having a largest magnitude and output the magnitude of the chosen complex-number symbol as the source data; and a phase determination circuit operatively connected to said magnitude determination circuit to determine a phase of the complex-number symbol having the largest magnitude and output the phase as the supplementary signal.

11. A demodulator according to claim 8, wherein said phase determination circuit provides the supplementary signal including power control commands.

* * * * *